3,251,866
Patented May 17, 1966

3,251,866
2α,16α - DIMETHYL - 11β,17α,21 - TRIHYDROXY - 4 - PREGNENE - 3,20 - DIONE AND DERIVATIVES THEREOF
Frank H. Lincoln, Kalamazoo, and William P. Schneider, Kalamazoo Township, Kalamazoo County, Mich., assignors to The Upjohn Company, Kalamazoo, Mich., a corporation of Michigan
No Drawing. Filed Sept. 25, 1958, Ser. No. 763,196
4 Claims. (Cl. 260—397.45)

This invention relates to certain novel steroids, more particularly to 2α,16α-dimethyl-11β,17α,21-trihydroxy-4-pregnene-3,20-dione, 2α,16α - dimethyl-17α,21-dihydroxy-4-pregnene - 3,11,20 - trione, 2α,16α-dimethyl-11β,17α,21-trihydroxy-1,4-pregnadiene-3,20-dione, 2α,16α - dimethyl-17α,21-dihydroxy-1,4-pregnadiene-3,11,20-trione, the corresponding 9α-halo, especially the 9α-fluoro compounds, 21 esters of each and intermediates in the production thereof, and to a process for their production. These compounds and a process for their production may be illustrated by the following formulae:

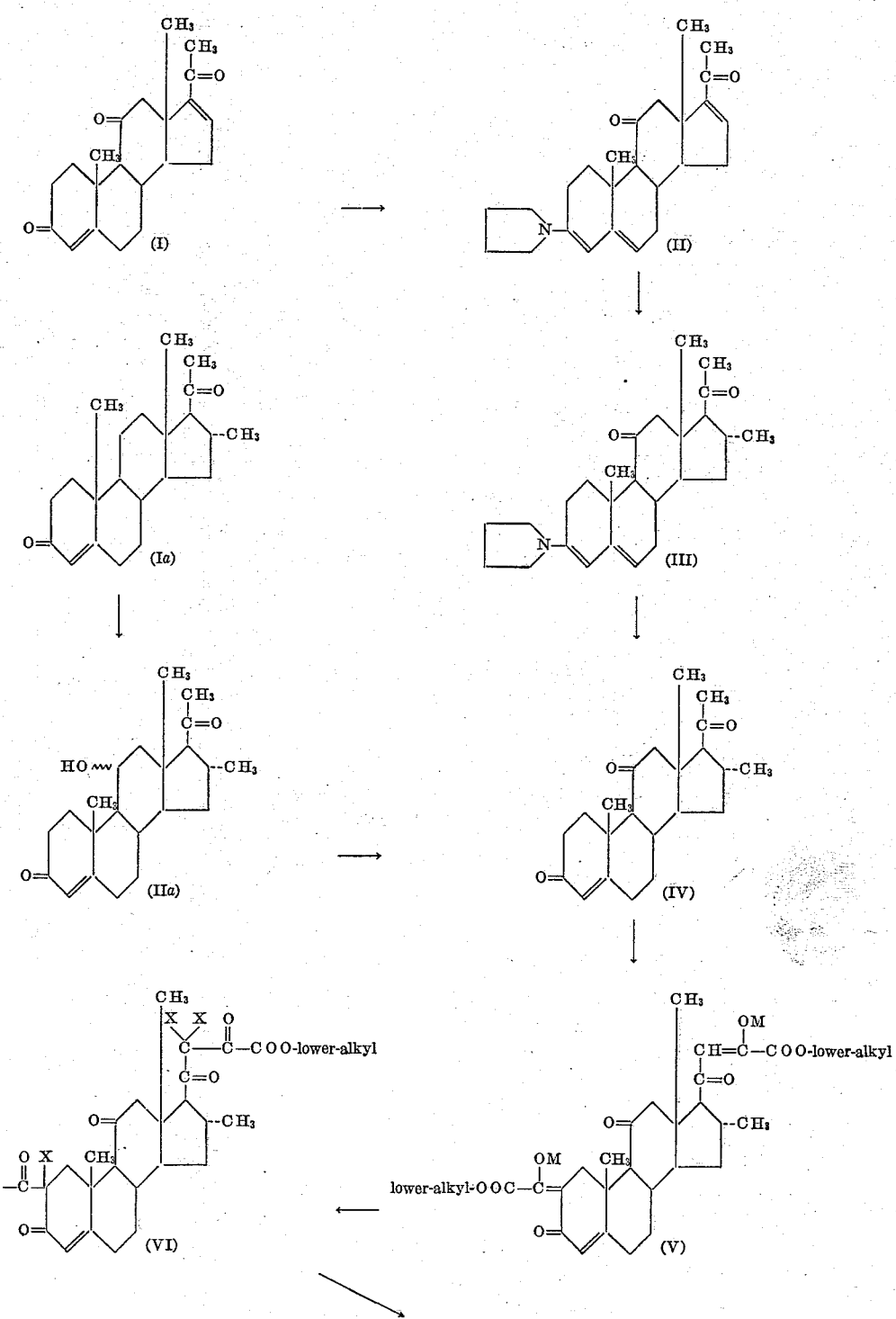

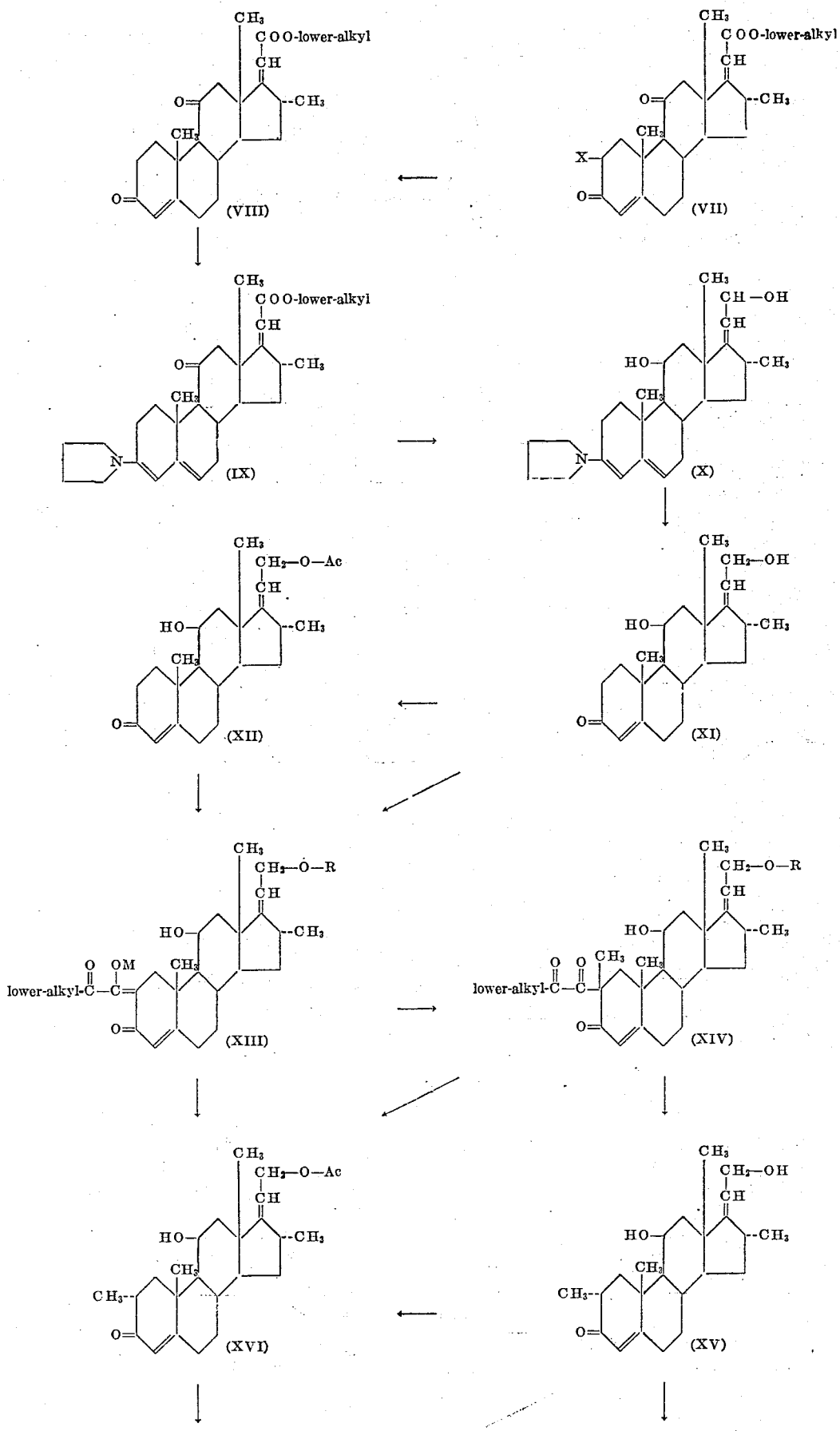

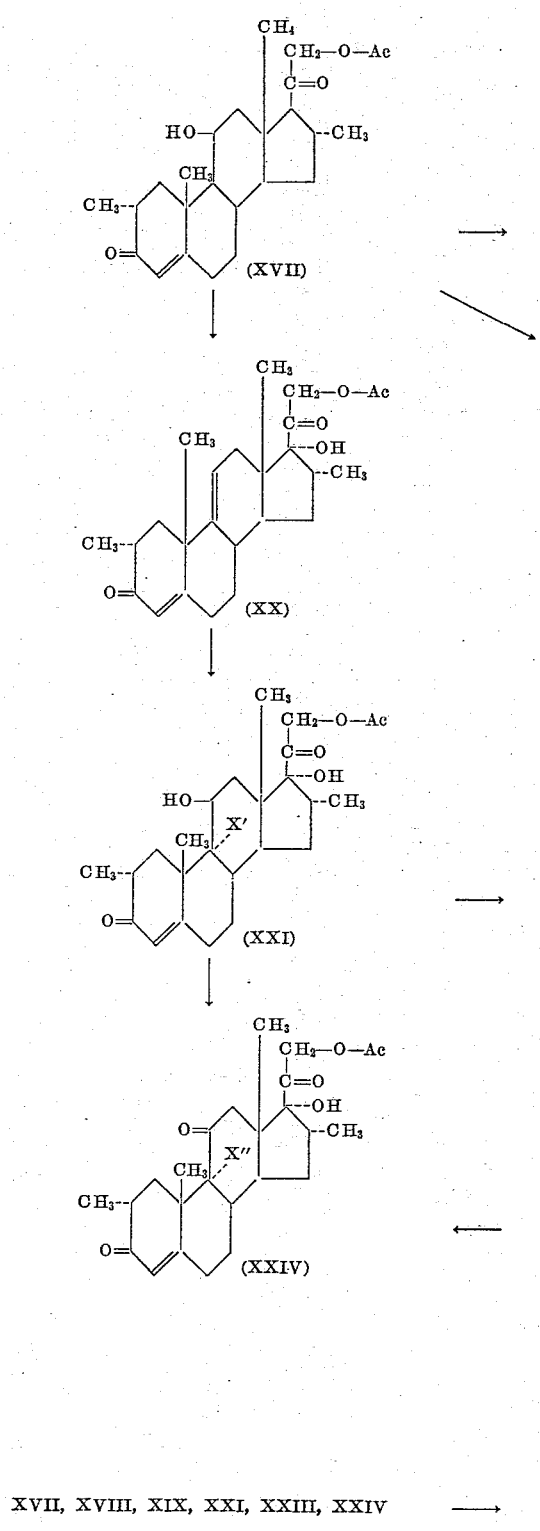
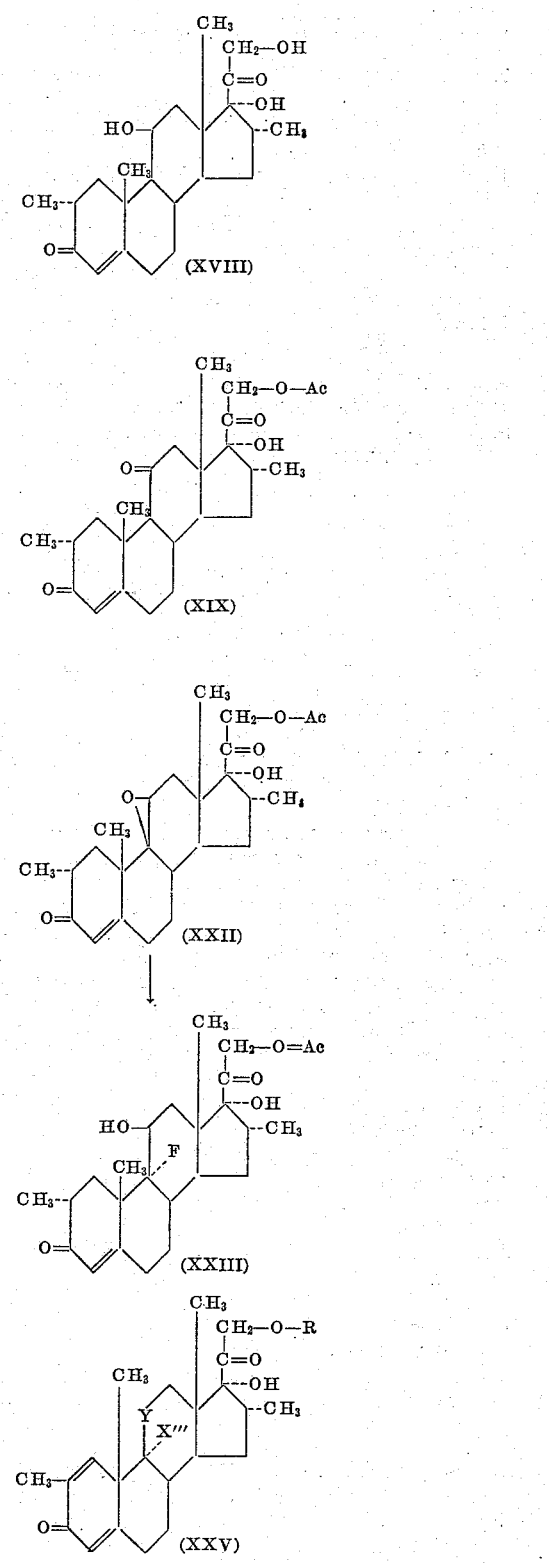

XVII, XVIII, XIX, XXI, XXIII, XXIV → wherein M is hydrogen or an alkali-metal, X is a halogen having an atomic weight from 35 to eighty, inclusive, i.e., chlorine or bromine, Ac is the acyl radical of a hydrocarbon carboxylic acid containing from one to twelve carbon atoms, inclusive, X' is a halogen having an atomic weight from 35 to 127, inclusive, i.e., chlorine, bromine or iodine, X''' is a halogen having an atomic weight from nineteen to 127, inclusive, i.e., fluorine, chlorine, bromine or iodide, X'''' is hydrogen, fluorine or chlorine, R is hydrogen or the acyl radical of a hydrocarbon carboxylic acid containing from one to twelve carbon atoms, inclusive, and Y is β-hydroxymethylene or carbonyl, i.e., the 11-substituent is β-hydroxy or keto. Lower-alkyl, wherever it appears means containing from one to eight carbon atoms, inclusive, e.g., methyl, ethyl, propyl, octyl.

The novel

2α,16α-dimethyl-11β,17α,21-trihydroxy-4-pregnene-3,20-dione,
2α,16α-dimethyl-17α,21-dihydroxy-4-pregnene-3,11,20-trione,
2,16α-dimethyl-11β,17α,21-trihydroxy-1,4-pregnadiene-3,20-dione,
2,16α-dimethyl-17α,21-dihydroxy-1,4-pregnadiene-3,11,20-trione,
2α,16α-dimethyl-9α-fluoro-11β,17α,21-trihydroxy-4-pregnene-3,20-dione,
2α,16α-dimethyl-9α-fluoro-17α,21-dihydroxy-4-pregnene-3,11,20-trione,
2,16α-dimethyl-9α-fluoro-11β,17α,21-trihydroxy-1,4-pregnadiene-3,20-dione,
2,16α-dimethyl-9α-fluoro-17α,21-dihydroxy-1,4-pregnadiene-3,11,20-trione and their 21-esters as defined hereinabove, and the corresponding 9α-chloro compounds, i.e., compounds represented by the following formulae and the corresponding Δ$^{1,4}$ compounds:

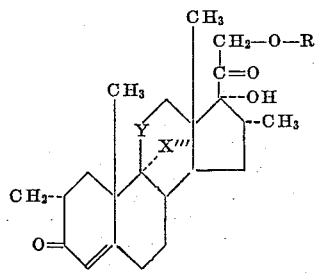

wherein X′′′, Y and R have the values given hereinbefore, are anti-inflammatory agents with improved ratio of therapeutic activity to undesirable side effects, e.g., gastro-intestinal disturbances, salt retention, edema, etc., known to exist with similar known physiologically active steroids. Many of the higher molecular weight esters, particularly the ones resistant to hydrolysis and/or more insoluble in body fluids, provide compounds with prolonged activity over the corresponding 21-hydroxy compounds. The compounds named above are useful in the treatment of various inflammatory conditions of the skin, eyes, respiratory tract and the bones and internal organs due to bacterial or viral infections, contact dermatitis and allergic reactions and possess improved therapeutic ratios of anti-inflammatory activity to undesirable side effects, compared to the corresponding compounds without the methyl group. For this purpose they may be incorporated in the various inert ointments, cremes, lotions and sprays well known in the art. They may be combined with any of the known antibiotics, especially the penicillins, neomycin, tetracycline, chloromycetin and novobiocin. The corresponding 9α-chloro compounds of the present invention, have especial advantages, e.g., a better therapeutic ratio of anti-inflammatory to undesirable side-effects, e.g., catabolic activity.

Other of the compounds of the present invention, as well as being useful as intermediates in the production of the above-described compounds also possess useful physiological activity, including glucocorticoid, mineralocorticoid and anti-inflammatory activity. Notable among these are compounds XX, XXI, XXII and the corresponding 21-hydroxy compounds of those having a 21-acyloxy group. Compound IV possesses useful progestational activity.

The novel compounds of the present invention are prepared from the known 11-keto-16-dehydroprogesterone (I) by the following reactions: The 3-keto group is selectively protected from reaction by conversion to a 3-ketal, e.g., ethylene ketal, 3-enol ether, e.g., methyl enol ether, or a 3-enamine, e.g., pyrrolidyl enamine, according to procedures well known in the art. The pyrrolidyl 3-enamine forms selectively but with the ketal and enol ether, the 20-keto group must first be protected from reaction. For this reason, the 3-enamine is the preferred protecting group. The 11-keto-16-dehydroprogesterone, protected at the 3-position, illustratively in the formulae by the 3-enamine (II), is then reacted with a methyl Grignard reagent, preferably methyl magnesium bromide or iodide, in the presence of a 1,4-addition promoting reagent, e.g., cuprous chloride [See "Grignard Reactions," Kharasch and Reinmuth, Prentice-Hall, Inc., Publishers (1954), page 219 for a discussion of other catalysts], to produce 11-keto-16α-methylprogesterone, still protected at the 3-position, illustratively with a 3-enamine (III). The 3-protecting group is then hydrolyzed, e.g., with aqueous acid or base, to produce 11-keto-16α-methylprogesterone (IV).

Alternatively, 16α-methylprogesterone (Ia) Marker et al., J. Am. Chem. Soc., 1289 (1942), is 11-oxygenated with a species of fungus which introduces an 11α- or 11β-hydroxy group to produce 11-hydroxy-16α-methylprogesterone (IIa) which is then oxidized, in the same manner that 11α- or 11β-hydroxyprogesterone has been oxidized to 11-ketoprogesterone, to produce 11-keto-16α-methylprogesterone (IV).

11-keto-16α-methylprogesterone is converted to 3,11-diketo-16α-methyl-4,17(20)-pregnadien-21-oic acid lower-alkyl ester in the manner described in U.S. Patent No. 2,790,814 for the conversion of 11-ketoprogesterone to 3,11-diketo-4,17(20)-pregnadien-21-oic acid methyl ester, i.e., the 11-keto-16α-methylprogesterone is reacted with more than two molar equivalents each of an alkyl diester of oxalic acid, preferably methyl or ethyl oxalate, and a base, preferably sodium methoxide or ethoxide or potassium tertiary butoxide, to produce the alkali-metal dienolate of 2,21-dialkoxyoxalyl-11-keto-16α-methylprogesterone (V, M=alkali-metal). This compound, or the free enol prepared by reaction of the alkali-metal dienolate with acetic acid (V, M=H), is then trihalogenated with chlorine or bromine, preferably the latter, to produce 2,21-dialkoxyoxalyl-2,21,21-trihalo-11-keto-16α-methylprogesterone (VI). This compound rearranges with strong base, e.g., an alkali-metal alkoxide, in the presence of an alkanol, e.g., sodium methoxide or ethoxide in methanol or ethanol, to produce 2-halo-3,11-diketo-16α-methyl-4,17(20)-pregnadien-21-oic acid alkyl ester (VII). The 2-halo group is removed by zinc and acetic acid or other halogen removing agent to produce 3,11-diketo-16α-methyl-4,17(20)-pregnadien-21-oic acid alkyl ester (VIII). This compound is a valuable intermediate in the production of a wide variety of 16-methyl steroids.

Conversion of 3,11-diketo-16α-methyl-4,17(20)-pregnadien-21-oic acid alkyl ester to 11β,21-dihydroxy-16α-methyl-4,17(20)-pregnadien-3-one (XI) is accomplished in the manner described in U.S. Patents 2,715,621, 2,781,343 and 2,790,814 for the conversion of 3,11-diketo-4,17(20)-pregnadien-21-oic acid alkyl ester to 11β,21-dihydroxy-4,17(20)-pregnadien-3-one, i.e., protecting the 3-keto group by a ketal, e.g., ethylene ketal, or preferably with an enamine, e.g., the 3-pyrrolidyl enamine as illustratively shown by Formula IX, and then reducing the 11-keto group and the 21-carboxylic acid ester group with lithium aluminum hydride, sodium aluminum hydride or other reagent capable of such reductions without affecting the double bonds, to produce 11β,21-dihydroxy-16α-methyl-4,17(20)-pregnadien-3-one, still protected at the 3-position, as illustratively shown by Formula X. The 3-keto protecting group is then removed by hydrolysis to produce 11β,21-dihydroxy-16α-methyl-4,17(20)-pregnadien-3-one (XI).

In the next step, 11β,21-dihydroxy-16α-methyl-4,17(20)-pregnadien-3-one (XI) or a 21-acylate thereof (XII) is condensed with a dialkyl ester of oxalic acid, preferably the methyl or ethyl ester, in the presence of an alkali-metal condensation catalyst, to produce an alkali-metal enolate of 2-alkoxyoxalyl-11β,21-dihydroxy-16α-methyl-4,17(20)-pregnadien-3-one (XIII, M=alkali-metal) or a 21-acylate thereof, respectively. The reaction is usually conducted at between about room temperature and about 100 degrees centigrade. The alkali-metal condensation catalysts include the alkali-metal alkoxides, the alkali-metals, alkali-metal amides, and alkyl alkali-metals, e.g., sodium methoxide, sodium ethoxide, potassium tertiary butoxide, finely dispersed sodium, triphenylmethyl sodium, etc. The alkali-metal alkoxides are preferred. Usually a slight excess of catalyst and a substantial excess of dialkyl oxalate are employed.

The thus produced alkali-metal enolate (XIII) is then alkylated with a methyl halide, such as methyl iodide, to produce a 2-lower-alkoxy-oxalyl-2,16α-dimethyl-11β,21-dihydroxy-4,17(20)-pregnadien-3-one or 21-acylate (XIV). The usual alkylation conditions are employed. The alkali-metal enolate (XIII) may be used in situ in the reaction mixture where it was formed as described above or as the isolated, purified salt suspended in an inert solvent.

In the next step, the 2-alkoxyoxalyl-2-methyl compound (XIV) is subjected to conditions whereby the alkoxyoxalyl group is removed, leaving the 2α-methyl group, thus producing 2α,16α-dimethyl-11β,21-dihydroxy-4,17(20)-pregnadien-3-one (XV) or a 21-acylate thereof (XVI). The reversal of an acetoacetic ester type condensation in a disubstituted β-ketoester is a recognized phenomenon. See "Organic Reactions," Wiley Publishers, vol. I, 269 (1942), where alcoholic sodium ethoxide was reported to produce the reversal phenomenon.

The reversal step of the present invention is produced by the alkali-metal alkylation catalysts described above, in the presence of water or a lower-alkanol, i.e., the reversal is promoted by the presence of hydroxide or alkoxide ions, particularly methoxide and ethoxide ions. Ordinarily, the 21-oxy group of the compound produced in the reversal is a hydroxy group (XV) as the conditions which promote the reversal of the 2-carbonyl group also promote the alcoholysis of any 21-acyloxy group to produce a 21-hydroxy. If the starting steroid for the condensation and/or alkylation step is a 21-hydroxy group, then the reaction product of the reversal step will also be a 21-hydroxy group. The more hindered 21-acyloxy groups, e.g., trimethylacetoxy, 2,6-disubstituted benzoyloxy, etc., will remain substantially intact during the reversal reaction whereas the unhindered groups, e.g., formoyloxy, acetoxy, and other α-unsubstituted hydrocarbon acids, etc., are almost completely converted to hydroxy groups. The degree of alcoholysis or hydrolysis of the partially hindered 21-acyloxy groups will depend, in part, upon the reaction temperature and time and reactants promoting the reversal.

The reaction product resulting from the reversal reaction will contain at least some 2,16α-dimethyl-11β,21-dihydroxy-4,17(20)-pregnadiene-3-one and frequently free 21-hydroxy steroid will be the predominant reaction product, e.g., if the starting steroid is a 21-hydroxy compound.

It is preferred in the oxidative hydroxylation of the reaction product of the reversal reaction that all the starting steroid for the oxidative hydroxylation be 21-acyloxy steroid (XVI). The reaction product (XV) is thus reacted with an esterification agent to protect the 21-hydroxy group. The esterification is performed in the usual manner employing an acid chloride or bromide or acid anhydride in pyridine or like amine, an acid in the presence of an esterification catalyst, or an ester under ester exchange reaction conditions. The thus-produced ester (XVI) is then oxidatively hydroxylated with osmium tetroxide and an oxidizing reagent, e.g., hydrogen peroxide, organic peracid, an amine oxide peroxide, or an aryl iodo oxide, in the manner described in U.S. Patents 2,769,825, 2,769,823 or in Hogg et al., J. Am. Chem. Soc., 77, 4436 (1955), to produce the corresponding 17α-hydroxy-20-keto-21-acyloxy compound (XVII), which can be hydrolyzed with base, e.g., sodium methoxide, sodium hydroxide, or sodium bicarbonate in methanol preferably while flushing with nitrogen to produce the 21-hydroxy compound, i.e., 2α,16α-dimethyl-11β,17α,21-trihydroxy-4-pregnene-3,20-dione (XVIII), or oxidized with an N-haloamide or N-haloimide, e.g., N-bromoacetamide in pyridine or like amine, or with chromic acid or sodium dichromate, to produce the corresponding 11-keto compound (XIX). The latter compounds can also be hydrolyzed to produce the corresponding 21-hydroxy compounds.

Alternatively, instead of the hydrolysis or oxidation reactions described above, the compounds represented by Formula XVII can be converted to the corresponding 9α-halo compounds by the following sequence of reactions: The 11β-hydroxy group is dehydrated with any of the known dehydrating reagents employed in the dehydration of an 11-hydroxy group, but preferably an N-haloamide or N-haloimide in the presence of anhydrous sulfur dioxide or with thionyl chloride or methanesulfonyl chloride in pyridine, or by heating with toluenesulfonic acid in an organic solvent such as benzene, according to methods known in the art, to produce the corresponding 9(11)-dehydro compound (XX). This compound is then reacted with hypochlorous, hypoiodous or hypobromous acid, prepared in the usual manner, e.g., with an N-haloamide or N-haloimide in the presence of aqueous perchloric acid, to produce the corresponding 9α-halo-11β-hydroxy compound (XXI). Reaction of one of these latter compounds with a base, e.g., potassium acetate, yields the corresponding epoxy compound (XXII). This epoxy compound is then reacted with aqueous or anhydrous hydrogen fluoride according to procedures known in the art to produce a 9α-fluoro-11β-hydroxy compound (XXIII) whose 21-acyloxy group can be hydrolyzed in the same manner as described above for the corresponding 9-hydrogen compounds to produce 2α,16α-dimethyl-9α-fluoro-11β,17α,21-trihydroxy-4-pregnene-3,20-dione or oxidized to produce the corresponding 11-keto compounds (XXIV, X″=F).

The $\Delta^1$ steroids (XXV) otherwise corresponding to compounds XVII to XXIV, e.g., 2,16α-dimethyl-11β,17α,21-trihydroxy-1,4-pregnadiene-3,20-dione and its 21-acetate, are prepared by dehydrogenation of the corresponding $\Delta^4$ compound (XVI, XVII, XVIII, XX, XXII, XXIII, XXIV, with a Fusarium [Experientia, 9, 371–372 (1953)] selenium dioxide or *Septomyxa affinis* as described hereinafter. Alternatively, 2α,16α-dimethyl-11β,17α,21-trihydroxy-4-pregnene-3,20-dione can be dehydrogenated as described above, converted to a 21-acylate, e.g., 21-acetate, and this compound then carried through the reactions described for the production of compounds XIX to XXIV, thereby producing the corresponding $\Delta^{1,4}$ compounds, as shown hereinafter.

The following examples are illustrative of the products and processes of this invention, but are not to be construed as limiting.

PREPARATION 1

*11-keto-16α-methylprogesterone*

To a hot solution of 4.56 g. (0.014 mol) of 11-keto-16-dehydroprogesterone in 45 ml. of methanol was added 2.25 ml. of pyrrolidine with swirling. The reaction product, the 3-pyrrolidyl enamine of 11-keto-16-dehydroprogesterone, soon separated as yellowish crystals. After cooling to five degrees, the mixture was filtered, the cake washed with cold methanol and dried under vacuum. There was obtained 4.56 g. of 3-pyrrolidyl-3,5,16-pregnatriene-11,20-dione melting at 154 to 169° C.

A solution of the thus-obtained enamine in 110 milliliters of tetrahydrofuran was added slowly to a stirred suspension of 45 ml. of commercial three molar methyl magnesium bromide, 0.90 g. of cuprous chloride and 50 ml. of tetrahydrofuran. The mixture was cooled to room temperature and stirred under a nitrogen atmosphere for three hours. The excess Grignard reagent was cautiously destroyed by the dropwise addition of 30 ml. of water. To the mixture, containing 3-pyrrolidyl-16α-methyl-3,5-pregnadiene - 11,20 - dione, was added 18 ml. of acetic acid and 72 ml. of methanol and the mixture was warmed until a clear dark yellow solution was obtained. 72 ml. of a 10 percent aqueous solution of sodium hydroxide was added, bringing the pH to 8. The mixture was heated under reflux for 45 minutes. 4.5 ml. of acetic acid and 250 ml. of water were added and the cooled mixture was extracted three times with methylene chloride. The combined extracts were washed with an aqueous sodium bicarbonate solution, water and then dried with sodium sulfate. The dried solution was evaporated and the residue, consisting essentially of 11-keto-16α-methylprogesterone, was dissolved in 400 ml. of methylene chloride and chromatographed through a 200 g. column of magnesium silicate (Florisil). The column was developed with 400 ml. portions of solvent of the following composition and order: 5 of hexanes (Skellysolve B) plus 3 percent acetone, 5 of hexanes plus 5 percent acetone, 8 of hexanes plus 7 percent acetone, 5 of hexanes plus 10 percent acetone, 4 of hexanes plus 15 percent acetone and finally, 1 of acetone. Fractions 9 to 25 (counting the methylene chloride fraction) were combined and recrystallized from a mixture of acetone and water to give 2.03 g. of 11-keto-16α-methylprogesterone melting at 179 to 182° C. A sample recrystallized from a mixture of ethyl acetate and hexanes melted at 183 to 185° C. had an $[\alpha]_D$ of plus 255° ($CHCl_3$), $$\lambda^{alc.}_{max.}\ 238\ m\mu,\ a_M\ 15,850$$

and the analysis below.

Calculated for $C_{22}H_{30}O_3$: C, 77.15; H, 8.83. Found: C, 76.95; H, 8.98.

PREPARATION 2

*11α-hydroxy-16α-methylprogesterone*

To 16.6 l. of a fermentation medium consisting of 1.2 percent corn steep solids and two percent Cerelose glucose, adjusted to a pH of 4.8 to 5.0, was added an inoculum of *Rhizopus nigricans* minus strain, American type culture collection number 6227b, and incubated for 24 hours at a temperature of 28 degrees centigrade using a rate of aeration of five percent air by volume per minute. To this medium containing a 24 hour growth of *Rhizopus nigricans* minus strain was added five grams of 16α-methylprogesterone in 150 milliliters of acetone to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filterate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in 250 ml. of methylene chloride and chromatographed over a 500 g. column of magnesium silicate (Florisil). The column was developed with 5 l. of hexanes (Skellysolve B) plus 5 percent acetone, 10 l. of hexanes plus 10 percent acetone, 5 l. of hexanes plus 25 percent acetone and 2 l. of acetone, in that order. The semicrystalline residues from the last 7 l. of hexanes plus 10 percent acetone, from all of the hexanes plus 25 percent acetone and the first liter of acetone eluates were combined in methylene chloride and rechromatographed over 400 g. of magnesium silicate. This column was developed with 8 l. of hexanes plus 10 percent acetone, 8 l. of hexanes plus 15 percent acetone, 4 l. of hexanes plus 20 percent acetone, 4 l. of hexanes plus 25 percent acetone and 2,400 ml. of acetone, in that order. The residues from the last 4 l. of hexanes plus 10 percent acetone and the first 1,600 ml. of hexanes plus 15 percent acetone eluates were combined and recrystallized twice from ethyl acetate to give 11α-hydroxy-16α-methyl-progesterone melting at 161 to 163° C., having an $[\alpha]_D$ of plus 149° in chloroform and the analysis below.

Calculated for $C_{22}H_{32}O_3$: C, 76.70; H, 9.36 Found: C, 76.46; H, 9.63.

The last 4 l. of hexanes plus 15 percent acetone and the first 2,400 ml. of hexanes plus 20 percent acetone elutes containing 6,11α-dihydroxy-16α-methylprogesterone which, when recrystallized from ethyl acetate, melted at 201 to 208° C., had an $[\alpha]_D$ of plus 82° in acetone and the analysis below.

Calculated for $C_{22}H_{32}O_4$: C, 73.30; H, 8.95. Found: C. 73.30; H, 9.14.

PREPARATION 3

*11-keto-16α-methylprogesterone*

To a stirred solution of 4.8 g. of sodium dichromate dissolved in a mixture of 37 ml. of water and 6.5 ml. of concentrated sulfuric acid was added, over a period of one hour, a solution of 8.325 g. of 11α-hydroxy-16α-methylprogesterone dissolved in 75 ml. of methylene chloride while maintaining the reaction temperature at between 23 and 25° C. Stirring was continued for an additional 2 hours after addition was complete and then the mixture was separated, the aqueous layer extracted with methylene chloride and the combined methylene chloride solutions were washed successively with water, aqueous sodium bicarbonate and water. The washed solution was dried with sodium sulfate and then evaporated to dryness, leaving a residue of 11-keto-16α-methylprogesterone.

PREPARATION 4

*3,11-diketo-16α-methyl-4,17(20)-pregnadiene-21-oic acid methyl ester*

A solution of 2.00 g. (5.8 mmol.) of 11-keto-16α-methylprogesterone in 30 ml. of dry tertiary butyl alcohol was warmed to 50° C. and stirred under nitrogen. To the solution was added 3.2 ml. of ethyl oxalate and 3.03 g. of a 25 percent methanolic sodium methoxide solution. A yellow-green precipitate of the sodium dienolate of 2,21-diethoxyoxalyl-11-keto-16α-methylprogesterone appeared almost immediately.

The mixture was stirred for 20 minutes after which a cooled solution of 0.98 g. of anhydrous sodium acetate and 0.84 ml. of acetic acid in forty milliliters of methanol was added, thus producing the free dienol. The solution was cooled to 0° C. and then treated dropwise with a cold solution of 2.0 g. of bromine in methanol over a period of ten minutes. There was thus produced 2,21,21 - tribromo - 2,21 - diethoxyoxalyl - 11 - keto - 16α-methylprogesterone.

The cooling bath was removed and to the solution was added 5.72 g. of a 25 percent methanolic sodium methoxide solution. The stirring was continued for 2.5 hours. There was thus produced 2-bromo-3,11-diketo-16α-methyl-4,17(20)-pregnadien-21-oic acid methyl ester.

To the resulting solution was then added five ml. of acetic acid and 1 g. of zinc dust and stirring was continued for thirty minutes. The mixture was filtered and the filtrate diluted with water and extracted thoroughly with methylene chloride. The extract was dried with sodium sulfate and evaporated. The residue was dissolved in 400 milliliters of methylene chloride and poured over a 200-gram column of magnesium silicate (Florisil). The column was developed with 400 ml. portions of solvent of the following composition and order: 4 of hexanes (Skellysolve B) plus 5 percent acetone, 10 of hexanes plus 7 percent acetone, 10 of hexanes plus 10 percent acetone and finally, 1 of acetone. Fractions 14 to 23 (counting the methylene chloride fraction) contained starting 11-keto-16α-methylprogesterone. Fraction 7 to 12 contained 3,11-diketo-16α-methyl-4,17(20)-pregnadien-21-oic acid methyl ester which when recrystallized from methanol and water and then from methanol, melted at 177 to 184° C., had a $\lambda_{max.}^{alc.}$ 23.5mμ, $a_M$ 26,200 an $[a]_D$ of plus 137° (CHCl₃) and the analysis below.

Calculated for $C_{23}H_{30}O_4$: C, 74.56; H, 8.16. Found: C, 74.58; H, 8.04.

The yield of product is increased if the initial reaction of 11-keto-16α-methylprogesterone with ethyl oxalate and sodium methoxide is conducted at somewhat higher temperatures and/or with longer reaction times.

PREPARATION 5

*11β,21-dihydroxy-16α-methyl-4,17(20)-pregnadien-3-one*

A solution of 6.0 g. of 3,11-diketo-16α-methyl-4,17(20)-pregnadien-21-oic acid methyl ester, 6 ml. of pyrrolidine, and 180 ml. of para-toluenesulfonic acid in 120 ml. of benzene were heated at the reflux temperature of the mixture for one hour with the concomitant removal of the water of reaction. The solvent was distilled from the mixture to leave a residue consisting essentiannl of 3 - pyrrolidiyl - 16α - methyl - 3,5,17(20)-pregnatrien-21-oic acid methyl ester.

This residue was dissolved in 30 ml. of benzene and 10 ml. of ether, a suspension of 2.2 g. of lithium aluminum hydride in 350 ml. of ether was added thereto over a period of 5 minutes, and the mixture was stirred at room temperature for 1.5 hours. 20 ml. of ethyl acetate was added to destroy excess lithium aluminum hydride, followed by 30 ml. of water. The ether and benzene were distilled at reduced pressure from the mixture to leave a residue consisting essentially of 3-pyrrolidyl-11β, 21-dihydroxy-16α-methyl-3,5,17(20)-pregnatriene and inorganic material.

This crude distillation residue was mixed with 400 ml. of methanol at 40° C. until solution was affected. 70 ml. of an aqueous 5 percent sodium hydroxide solution was added thereto and heating of the mixture at about 40° C. was continued for 10 minutes. The solution was neutralized with acetic acid and the solvent distilled therefrom at reduced pressure and at a temperature below 45° C. The residue was mixed with 100 ml. of water containing 10 ml. of concentrated hydrochloric acid, filtered and washed with water to give 11β,21-dihydroxy-16α-methyl-4,17(20)-pregnadien-3-one.

EXAMPLE 1

*2-ethoxyoxalyl-11β,21-dihydroxy-16α-methyl-4,17(20)-[cis]-pregnadien-3-one*

A solution of 17.27 g. (0.05 mol.) of 11β,21-dihydroxy-16α-methyl-4,17(20)-pregnadien-3-one was prepared in 300 ml. of dry tertiary butyl alcohol by heating the mixture at 70° C. The solution was cooled to 55° C. and to the stirred solution, protected from atmospheric oxygen by bubbling nitrogen therethrough, was added 14.6 g. (0.10 mol.) of ethyl oxalate followed by a solution of 4.05 g. (0.075 mol.) of sodium methoxide dissolved in 16 ml. of methanol. A thick, pale yellow precipitate soon appeared. Stirring was continued for 10 minutes and the mixture was then diluted with 300 ml. of anhydrous ether. Stirring was continued for an additional 15 minutes and the mixture then filtered. The pale yellow-green precipitate was washed and dried at room temperature in a vacuum. The yield of about 24 g. of precipitate consisted primarily of the sodium enolate of 2-ethoxy-oxalyl-11β, 21-dihydroxy-16α-methyl-4,17(20)-pregnadien-3-one.

The precipitate was dissolved in 250 ml. of water and the solution acidified with dilute hydrochloric acid. The resulting precipitate was collected by filtration, washed with water and dried. There was thus obtained an amorphous powder consisting essentially of 2-ethoxyoxalyl-11β, 21 - dihydroxy - 16α - methyl - 4,17(20) - pregnadien - 3-one, which gave a positive red-brown ferric chloride test.

EXAMPLE 2

*2α,16α-dimethyl-11β,21-dihydroxy-4,17(20)-pregnadien-3-one*

A mixture of 4.70 g. of crude 2-ethoxyoxalyl-11β,21-dihydroxy - 16α - methyl - 4,17(20) - pregnadien - 3 - one, obtained according to the method of Example 1, 10 g. of anhydrous potassium carbonate, 15 ml. of methyl iodide and 100 ml. of acetone was stirred at about 25° C. for 40 hours. Water was then added and the mixture extracted thoroughly with methylene chloride. The extract was washed with water, dried and the solvent distilled to leave a glassy residue consisting essentially of 2-methyl-2-ethoxyoxalyl - 11β,21 - dihydroxy - 16α - methyl - 4, 17(20)-pregnadien-3-one.

The glassy residue was dissolved in 50 ml. of methanol to which was then added 3 ml. of a 25 percent solution of sodium methoxide in methanol. The now red solution was stirred for 2 hours at about 25° C. The mixture was then diluted with about 200 ml. of water and extracted thoroughly with methylene chloride. The combined methylene chloride extracts were washed with water, dried and the solvent then distilled therefrom, leaving a steroid residue consisting essentially of 2α,16α-dimethyl-11β,21-dihydroxy-4,17(20)-pregnadien-3-one.

EXAMPLE 3

*2α,16α-dimethyl-11β,21-dihydroxy-4,17(20)-pregnadien-3-one 21-acetate*

The crude 2α,16α-dimethyl-11β,21-dihydroxy-4,17(20)-pregnadien-3-one obtained from a reversal reaction performed exactly as described in Example 2 was dissolved in a mixture of 10 ml. of acetic anhydride and 10 ml. of dry pyridine. The mixture was maintained at about 25° C. for about 16 hours. The excess acetic anhydride was then decomposed with ice water and the resulting gummy precipitate was extracted with benzene. The benzene solution was washed with cold dilute hydrochloric acid, cold aqueous sodium bicarbonate and finally with water and then dried. The dried benzene solution was poured over a chromatographic column of 100 g. of magnesium silicate (Florisil). The column was developed with 1,350 ml. of hexanes (Skellysolve B) containing 5 percent acetone followed by 750 ml. of hexanes plus 7.5 percent acetone and then 150 ml. of acetone. The eluates were collected in 150 ml. fractions. The fractions containing the major proportion of the total solids consisted of crystalline 2α,16α-dimethyl-11β,21-dihydroxy-4,17(20)-pregnadien-3-one 21-acetate.

Similarly 2α,16α-dimethyl-11β,21-dihydroxy-4,17(20)-pregnadien-3-one is converted, by esterification of the 21-hydroxy group, e.g., by reaction with the appropriate acid anhydride, acid chloride or bromide, ester by ester exchange, acid in the presence of an esterification catalyst, etc., to other 2α,16α-dimethyl-11β,21-dihydroxy-4,17(20)-pregnadien-3-one 21-acylates wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid, (which can be converted to water soluble, e.g., sodium, salts) e.g., succinic, glutaric, α-methylglutaric, β-methylglutaric, etc.

EXAMPLE 4

$2\alpha,16\alpha$-dimethyl-$11\beta,17\alpha,21$-trihydroxy-4-pregnene-3,20-dione 21-acetate To a solution of 1.40 g. (3.5 mmol.) of $2\alpha,16\alpha$-dimethyl-$11\beta,21$-dihydroxy-4,17(20)-pregnadiene-3-one 21-acetate in 70 ml. of dry tertiary butyl alcohol was added at room temperature 9 ml. of dry pyridine, 5.8 ml. of dry tertiary butyl alcohol solution containing 1.37 g. (9.1 mmol.) of N-methylmorpholine oxide peroxide (U.S. 2,769,823), and 10 mg. of osmiumtetroxide, in that order. The resulting solution was stirred at between 25 and 30° C. for 18 hours. There was then added 150 ml. of water to the mixture which was then extracted thoroughly with methylene chloride, the methylene chloride solution washed with water, cold dilute hydrochloric acid, cold aqueous sodium bicarbonate, water and then dried. The solvent was distilled from the dried solution at reduced pressure. The crude residue was dissolved in methylene chloride and poured over a column of 110 g. magnesium silicate (Florisil). The column was developed with 175 ml. portions of solvent of the following composition and order: 8 of hexanes (Skellysolve B) plus 10 percent acetone, 7 of hexanes plus 12 percent acetone, 2 of hexanes plus 15 percent acetone, and 1 of acetone. The hexanes plus 5 percent acetone eluted starting steroid. The fractions comprising the major peak of eluted solids contained $2\alpha,16\alpha$-dimethyl-$11\beta,17\alpha,21$-trihydroxy-4-pregnene-3,20-dione 21-acetate.

EXAMPLE 5

$2\alpha,16\alpha$-dimethyl-$11\beta,17\alpha,21$-trihydroxy-4-pregene-3,20-dione 100 mg. of $2\alpha,16\alpha$-dimethyl-$11\beta,17\alpha,21$-trihydroxy-4-pregnene-3,20-dione 21-acetate were dissolved in a solution consisting of 2 ml. of methanol and 0.1 ml. of water, previously purged of air-oxygen by passing nitrogen through it, and to the resulting solution was added 50 mg. of potassium bicarbonate. The mixture was allowed to stand at room temperature for a period of six hours in a nitrogen atmosphere, thereupon neutralized with five percent aqueous hydrochloric acid solution, diluted with five milliliters of water and refrigerated. The mixture was then filtered and the solids recrystallized from acetone-Skellysolve B hexanes to give pure $2\alpha,16\alpha$-dimethyl-$11\beta,17\alpha,21$-trihydroxy-4-pregnene-3,20-dione.

EXAMPLE 6

$2,16\alpha$-dimethyl-$11\beta,17\alpha,21$-trihydroxy-1,4-pregnadiene-3,20-dione Septomyxa affinis (A.T.C.C. 6737) was maintained on malt agar slants composed of 50 g. of dry malt extract, 5 g. of Edamine enzymatic digest of lactalbumin, and 20 g. of agar diluted to 1 l. with tap water and adjusted to a pH between 6.5 to 7.0. Inoculum from the agar slant was transferred to 1 l. Erlenmeyer flasks containing 100 ml. of malt extract agar and incubated at room temperature for from 4 to 7 days to produce spores. The spores were suspended in 100 ml. of sterile one percent saline. 5 ml. of this saline spore inoculum was introduced into each of 5 250 ml. flasks containing 100 ml. each of medium consisting of 1 percent Cerelose dextrose and 2 percent corn steep liquor of 60 percent solids which was adjusted to pH 4.8 to 5.0 with sodium hydroxide. These were incubated for 48 to 72 hours with shaking at room temperature and then added to six l. of the same fermentation medium as described above. This culture was maintained for 24 hours at room temperature with aeration at the rate of 1 l. per minute. This 6 l. of seed culture was then added to 100 l. of medium and grown at room temperature for 24 hours with agitation and aeration at a rate of 2 l. per minute. To this 24-hour culture there was added 25 g. of $2\alpha,16\alpha$-dimethyl-$11\beta,17\alpha,21$-trihydroxy-4-pregnene-3,20-dione dissolved in 500 ml. of acetone. Agitation and aeration at the rate of 1 l. per minute was continued for 24 hours.

The broth was filtered to give mycelium and filtered beer. The mycelium was washed with 20 l. of water and the water washing was added to the filtered beer. The washed mycelium was suspended and slurried twice, each time with 12 l. of acetone, and then suspended and slurried twice, each time with 12 l. of methylene chloride. The thus-obtained acetone and methylene chloride mycelium extracts were pooled and added to the extract obtained from four extractions of the filtered beer and water wash, each extraction being with 24 l. of methylene chloride. The extracts from the filtered beer and water wash and those from the mycelium were combined and washed twice, each time with 12 l. of 2 percent sodium bicarbonate solution and then twice, each time with 12 l. of water. The washed extract was concentrated in a still to give 3 l. of concentrate which was then evaporated to dryness on a steam bath in air to give a crude crystalline residue. This residue was triturated 6 times, each time with 25 ml. of diethyl ether. The remaining crystals were dissolved in 250 ml. of hot methanol, filtered, and cooled to give crystals of $2,16\alpha$-dimethyl-$11\beta,17\alpha,21$-trihydroxy-1,4-pregnadiene-3,20-dione.

EXAMPLE 7

$2,16\alpha$-dimethyl-$11\beta,17\alpha,21$-trihydroxy-1,4-pregnadiene-3,20-dione 21-acetate Following the procedure of Example 3, but substituting one gram of $2,16\alpha$-dimethyl-$11\beta,17\alpha,21$-trihydroxy-1,4-pregnadiene-3,20-dione as starting steroid, there was produced $2,16\alpha$-dimethyl-$11\beta,17\alpha,21$-trihydroxy-1,4-pregnadiene-3,20-dione 21-acetate.

Other 21-esters of $2,16\alpha$-dimethyl-$11\beta,17\alpha,21$-trihydroxy-1,4-pregnadiene-3,20-dione and of $2\alpha,16\alpha$-dimethyl-$11\beta,17\alpha,21$-trihydroxy-4-pregnene-3,20-dione are prepared in the manner described in the paragraph following Example 3.

EXAMPLE 8

$2\alpha,16\alpha$-dimethyl-$17\alpha,21$-trihydroxy-4-pregene-3,11,20-trione 21-acetate To a solution of 2.5 mmol. of $2\alpha,16\alpha$-dimethyl-$11\beta,17\alpha,21$-trihydroxy-4-pregnene-3,20-dione 21-acetate and 2 ml. of pyridine in 75 ml. of tertiary butanol was added 500 mg. of N-bromoacetamide. The reaction mixture was maintained at room temperature for about 16 hours whereupon the solution was diluted with 50 ml. of water containing 500 mg. of sodium sulfite, and the mixture was then concentrated at reduced pressure to about 40 ml. The distillation residue was refrigerated, filtered, and the filter cake was washed with water and then dried. It consisted of $2\alpha,16\alpha$-dimethyl-$17\alpha,21$-dihydroxy-4-pregnene-3,11,20-trione 21-acetate.

Following the procedure of Example 8, but substituting $2,16\alpha$-dimethyl-$11\beta,17\alpha,21$-trihydroxy-1,4-pregnadiene-3,20-dione 21-acetate as starting compound, there is thus produced $2,16\alpha$-dimethyl-$17\alpha,21$-dihydroxy-1,4-pregnadiene-3,11,20-trione 21-acetate.

Similarly, substituting another 21-acylate of $2,16\alpha$-dimethyl-$11\beta,17\alpha,21$-trihydroxy-1,4-pregnadiene-3,20-dione or 21-acylate of $2\alpha,16\alpha$-dimethyl-$11\beta,17\alpha,21$-trihydroxy-4-pregnene-3,20-dione wherein the acyl radical is, e.g., that of an acid named in the paragraph following Example 3, as the starting compound in the oxidation reaction described in Example 8, there is thus produced the corresponding 21-acylate of $2,16\alpha$-dimethyl-$17\alpha,21$-dihydroxy-1,4-pregnadiene-3,11,20-trione and of 2α,16α-dimethyl-17a,21-dihydroxy-4-pregnene - 3,11,20 - trione, respectively.

EXAMPLE 9

*2α,16α-dimethyl-17α,21-dihydroxy-4,9(11)-pregnadiene-3,20-dione 21-acetate*

To a solution of 8.5 g. of 2α,16α-dimethyl-11β,17α,21-trihydroxy-16α-methyl-4-pregnene-3,20-dione 21 - acetate in 42.5 ml. of pyridine was added 5.63 g. of N-bromo-acetamide. After standing at room temperature for a period of 15 minutes, the reaction solution was cooled to 5 to 10° C. and, with shaking, sulfur dioxide gas was passed over the surface until the solution gave no color with acidified starch-iodide paper. During the addition of sulfur dioxide gas, the reaction became warm. The temperature was kept under 30° C. by external cooling and by varying the rate of sulfur dioxide addition. Thereafter to the reaction mixture was added 400 ml. of ice water and the resulting precipitate collected by filtration. This material was recrystallized from acetone-Skellysolve B hexanes to give 2α,16α-dimethyl-17α,21-dihydroxy-4,9(11)-pregnadiene-3,20-dione 21-acetate.

Following the procedure of Example 9, but substituting 2,16α-dimethyl-11β,17α,21-trihydroxy - 1,4 - pregnadiene-3,20-dione 21-acetate as the starting compound, there is thus produced 2,16α-methyl-17α,21-dihydroxy-1,4,9(11)-pregnatriene-3,20-dione 21-acetate.

Similarly, substituting another 21-acylate of 2,16α-dimethyl-11β,17α,21-trihydroxy-1,4-pregnadiene - 3,20 - dione or a 21-acylate of 2α,16α-dimethyl-11β,17α,21-trihydroxy-4-pregnene-3,20-dione wherein the acyl radical is, e.g., that of an acid named in the paragraph following Example 3, as the starting compound in the dehydration reaction described in Example 9, there is thus produced the corresponding 21-acylate of 2,16α-dimethyl-17α,21-dihydroxy-1,4,9(11)-pregnatriene-3,20-dione and of 2α,16α-dimethyl-17a,21-dihydroxy-4,9(11)-pregnadiene-3,20-dione, respectively.

EXAMPLE 10

*2α,16α-dimethyl-9α-bromo-11β,17α,21-trihydroxy-4-pregnene-3,20-dione 21-acetate*

To a solution of 5.9 g. of 2α,16α-dimethyl-17α,21-dihydroxy-4,9(11)-pregnadiene-3,20-dione 21-acetate in 100 ml. of methylene chloride and 250 ml. of tertiary butyl alcohol was added a solution of 14 ml. of 72 percent perchloric acid in 100 ml. of water followed by a solution of 2.34 g. of N-bromo-acetamide in 60 ml. of tertiary butyl alcohol. After stirring the reaction mixture for 15 minutes, a solution of 2.8 g. of sodium sulfite in 140 ml. of water was added and the reaction mixture was concentrated to a volume of about 500 ml. under reduced pressure at about 40° C. At this point crystallization started. The concentrate was cooled in an ice bath and while stirring 500 ml. of water was added. After stirring for a period of one hour, the crystalline product was isolated by filtration, the crystals were washed with water and air-dried to give 2α,16α-dimethyl-9α-bromo-11β,17α,21-trihydroxy-4-pregnene-3,20-dione 21-acetate.

Following the procedure of Example 10, but substituting 2,16α-dimethyl-17α,21-dihydroxy-1,4,9(11)-pregnatriene-3,20-dione 21-acetate as the starting compound, there is thus produced 2,16α-dimethyl-9α-bromo-11β,17α,21-trihydroxy-1,4-pregnadiene-3,20-dione 21-acetate.

Similarly, substituting another 21-acylate of 2,16α-dimethyl-17α,21-dihydroxy-1,4,9(11) - pregnatriene - 3,20-dione or a 21-acylate of 2α,16α-dimethyl-17α,21-dihydroxy-4,9(11)-pregnadiene-3,20-dione wherein the acyl radical is, e.g., that of an acid named in the paragraph following Example 3, as the starting compound in the reaction described in Example 10, there is thus produced the corresponding 21-acylate of 2,16α-dimethyl-9α-bromo-11β,16α,21-trihydroxy-1,4-pregnadiene-3,20-dione and of 2α,16α-dimethyl-9α - bromo - 11β,17α,21 - trihydroxy - 4-pregnene-3,20-dione, respectively.

Substituting N-chlorosuccinimide for the N-bromoacetamide in the reaction described in Example 10 and the paragraph following is productive of the corresponding 9α-chloro compounds, e.g., 2,16α-methyl-9α-chloro-11β,17α,21-trihydroxy-1,4-pregnadiene-3,20-dione 21 - acetate and 2α,16α-dimethyl19α-chloro-11β,17α,21-trihydroxy - 4-pregnene-3,20-dione 21-acetate.

EXAMPLE 11

*2α,16α-dimethyl-9β,11β-epoxy-17α,21-dihydroxy-4-pregnene-3,20-dione 21-acetate*

To a solution of 6.78 g. of 2α,16α-dimethyl-9α-bromo-11β,17α,21 - trihydroxy-4-pregnene-3,20-dione 21-acetate in 175 ml. of acetone was added 6.78 g. of potassium acetate and the resulting suspension was heated under reflux for a period of seventeen hours. The mixture was then concentrated to approximately 60 ml. of volume at reduced pressure on the steam bath and thereupon diluted with water and extracted with methylene chloride. The methylene chloride extracts were combined, washed with water, dried over anhydrous sodium sulfate and evaporated. The residue was redissolved in methylene chloride and chromatographed over 200 g. of magnesium silicate (Florisil). The column was eluted with 1 l. portions of hexnaes (Skellysolve B) containing increasing proportions of acetone. There was thus eluted 2α,16α-dimethyl - 9β,11β - epoxy-17α,-21-dihydroxy-4-pregnene-3,20-dione 21-acetatae which was freed of solvent by evaporation of the eluates.

Following the procedure of Example 11, but substituting 2,16α - dimethyl-9α-bromo-11β,17α,21-trihyroxy-1,4-pregnadiene-3,20-dione 21-acetate as the starting compound, there is thus produced 2,16α-dimethyl-9β,11β-epoxy - 17α,21-dihydroxy-1,4-pregnadiene-3,20-dione 21-acetate.

Similarly, substituting another 21-acylate of 2,16α-dimethyl - 9α - bromo - 11β,17α-21-trihydroxy-1,4-pregnadiene-3,20-dione or a 21-acylate of 2α,16α-dimethyl-9α-bromo - 11β,17α,21 - trihydroxy-4-pregnene-3,20-dione wherein the acyl radical is, e.g., that of an acid named in the paragraph following Example 3, as the starting compound in the reaction described in Example 11, there is thus produced the corresponding 21-acylate of 2,16α-dimethyl - 9β,11β - epoxy-17α,21-dihydroxy-1,4,-pregnadiene-3,20 dione and of 2α,16α-dimethyl-9β,11β-epoxy-17α,21-dihydroxy-4-pregnene-3,20-dione, respectively.

EXAMPLE 12

*2α,16α-dimethyl-9α-fluoro-11β,17α,21-trihydroxy-4-pregnene-3,20-dione 21-acetate*

To approximately 1.3 g. of hydrogen fluoride contained in a polyethylene bottle and maintained at −60° C. was added 2.3 ml. of tetrahydrofuran and then a solution of 500 mg. of 2α,16α-dimethyl-9β,11β-epoxy-17α,21-dihydroxy - 4 - pregnene-3,20-dione 21-acetate in 2 ml. of methylene chloride. The steroid solution was rinsed in with an additional 1 ml. of methylene chloride. The light red colored solution was then kept at approximately −30° C. for 1 hour and at −10° C. for 2 hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to approximately 35 ml. of volume. This solution was chromatographed over forty milliliters of magnesium silicate (Florisil). The column was developed with 500 ml. portions of hexanes (Skellysolve B) containing increasing proportions of acetone. There was thus eluted 2α,16α - dimethyl-9α-fluoro-11β,17α,21-trihydroxy-4-pregnene-3,20-dione 21-acetate which was freed of solvent by evaporation of the eluate fractions.

Following the procedure of Example 12, but substituting 2,16α - dimethyl - 9β,11β-epoxy-17α,21-dihydroxy-1,4-pregnadiene-3,20-dione 21-acetate as the starting compound, there is thus produced 2,16α-dimethyl-9α-fluoro-11β,17α,21 - trihydroxy - 1,4 - pregnadiene-3,20-dione 21-acetate.

Similarly, substituting another 21-acylate of 2,16α-dimethyl - 9β,11β - epoxy - 17α,21-dihydroxy-1,4-pregnadiene-3,20-dione or a 21-acylate of 2α,16α-dimethyl-9β,11β - epoxy - 17α,21-dihydroxy-4-pregnene-3,20-dione wherein the acyl radical is, e.g., that of an acid named in the paragraph following Example 3, as the starting compound in the reaction described in Example 12, there is thus produced the corresponding 21-acylate of 2,16α-dimethyl - 9α - fluoro-11β,17α,21-trihydroxy-1,4-pregnadiene - 3,20 - dione and of 2α,16α-dimethyl-9α-fluoro-11β,17α,21 - trihydroxy - 4-pregnene-3,20 dione, respectively.

EXAMPLE 13

*2α,16α-dimethyl-9α-fluoro-17α,21-dihydroxy-4-pregnene-3,11,20-trione 21-acetate*

A solution was prepared containing 1 ml. of acetic acid, 50 ml. of 2α,16α - dimethyl-9α-fluoro-11β,17α,21-trihydroxy - 4 - pregnene-3,20-dione 21-acetate, 20 mg. of chromic anhydride and one drop (approximately 50 mg.) of water. This mixture was shaken several times at room temperature and allowed to stand for 4 hours. Thereafter it was poured into 10 ml. of water and refrigerated for 20 hours at about 5° C. The steroid which separated from the aqueous mixture was collected on filter paper and dried to give 2α,16α-dimethyl-9α-fluoro-17α,21-dihydroxy-4-pregnene-3,11,20-trione 21-acetate.

Following the procedure of Example 13, but substituting 2,16α - dimethyl - 9α - fluoro-11β,17α,21-trihydroxy-1,4-pregnadiene-3,20-dione 21-acetate as the starting compound, there is thus produced 2,16α-dimethyl-9α-fluoro-17α,21 - dihydroxy - 1,4-pregnadiene-3,11,20-trione 21-acetate.

Similarly, substituting another 21-acylate of 2,16α-dimethyl - 9α - fluoro - 11β,17α,21-trihydroxy-1,4-pregnadiene-3,20-dione or a 21-acylate of 2α, 16α-dimethyl-9α - fluoro - 11β,17α,21 - trihydroxy - 4 - pregnene - 3,20-dione wherein the acyl radical is, e.g., that of an acid named in the paragraph following Example 3, as the starting compound in the oxidation reaction described in Example 13, there is thus produced the corresponding 21-acylate of 2α,16α-dimethyl-9α-fluoro-17α,21-dihydroxy-1,4-pregnadiene-3,11,20-trione and of 2α,16α-dimethyl-9α-fluoro - 17α,21 - dihydroxy-4-pregnene-3,11,20-trione, respectively.

EXAMPLE 14

*2α,16α-dimethyl-9α-fluoro-11β,17α,21-trihydroxy-4-pregnene-3,20-dione*

3.25 g. of 2α,16α-dimethyl-9α-fluoro-11β,17α,21-trihydroxy-4-pregnene-3,20-dione 21-acetate were dissolved in 325 ml. of methanol, previously purged of air-oxygen by passing nitrogen through it for 10 minutes, and thereto was added a solution of 1.63 g. of potassium bicarbonate in 30 ml. of water, similarly purged of oxygen. The mixture was allowed to stand at room temperature for a period of 5 hours in a nitrogen atmosphere, thereupon neutralized with 2.14 ml. of acetic acid in 40 ml. of water. The mixture was concentrated to approximately ⅓ volume at reduced pressure on a 60° C. water-bath. Thereupon 250 ml. of water was added and the mixture chilled. The crystalline product was collected on a filter, washed with water and dried to give 2α,16α-dimethyl-9α-fluoro-11β,17α,21-trihydroxy-4-pregene-3,20 dione.

Following the procedure of Example 14, but substituting 2,16α - dimethyl - 9α-fluoro-11β,17α,21-trihydroxy-1,4-pregnadiene-3,20-dione 21-acetate as the starting compound, there is thus produced 2,16α-dimethyl-9α-fluoro-11β,17α,21-trihydroxy-1,4-pregnadiene-3,20-dione.

Similarly, 2α,16α - diethyl-9α-fluoro-17α-21-dihydroxy-4-pregnene-3,11,20-trione 21-acetate is hydrolyzed to 2α,16α - dimethyl - 9α - fluoro - 17α,21-dihydroxy-4-pregnene-3,11,20-trione and 2,16α-dimethyl-9α-fluoro-17α,21-dihydroxy - 1,4 - pregnadiene - 3-11,20-trione 21-acetate is hydrolyzed to 2,16α-dimethyl-9α-fluoro-17α,21-dihydroxy-1,4-pregnadiene-3,11,20-trione.

EXAMPLE 15

*2α,16α-dimethyl-9α-fluoro-11β,17α,21-trihydroxy-4-pregnene-3,20-dione 21-propionate*

A solution was prepared containing 50 mg. of 2,16α-dimethyl - 9α - fluoro-11β,17α,21-trihydroxy-4-pregnene-3,20-dione in 1 ml. of pyridine and 1 ml. of propionic anhydride. The solution was allowed to stand at room temperature for a period of 21 hours and was then poured into 10 ml. of water. The reaction mixture was then extracted with 3 10 ml. portions of methylene chloride, the methylene chloride extracts were combined, washed with water, dried over anhydrous sodium sulfate and evaporated to give a residue of 2α,16α-dimethyl-9α-fluoro-11β,17α,21 - trihydroxy-4-pregnene-3,20-dione 21-propionate.

Following the procedure of Example 15, but substituting 2,16α - dimethyl-9α-fluoro-11β,17α,21-trihydroxy-1,4-pregnadiene-3,20-dione as starting compound, there is thus produced 2,16α-dimethyl-9α-fluoro-11β,17α,21-trihydroxy-1,4-pregnadiene-3,20-dione 21-propionate.

Similarly, 2,16α - dimethyl-9α-fluoro-17α,21-dihydroxy-1,4-pregnadiene-3,11,20-trione is converted to 2,16α-dimethyl - 9α - fluoro - 17α,21 - dihydroxy - 1,4-pregnadiene - 3,11,20 - trione - 21 - propionate and 2α,16α - dimethyl - 9α - fluoro - 17α,21-dihydroxy - 4 - pregnene-3,11,20-trione is converted to 2α,16α-dimethyl-9α-fluoro-17α,21-dihydroxy-4-pregnene-3,11,20 - trione 21 - propionate.

Similarly, substituting another acylating agent for the propionic anhydride in the esterification of 2,16α-dimethyl - 9α-fluoro-11β,17α,21-trihydroxy-1,4-pregnadiene-3,20-dione or 2α,16α-dimethyl-9α-fluoro-11β,17α,21-trihydroxy-4-pregnene-3,20-dione, e.g., in the manner described in the paragraph following Example 3, there is thus produced other 21-acylates of 2,16α-dimethyl-9α-fluoro-11β,17α - 21 - trihydroxy - 1,4-pregnadiene-3,20-dione and of 2α,16α - dimethyl-9α-fluoro-11β,17α,21-trihydroxy-4-pregnene-3,20-dione, respectively, wherein the acyl radical is, e.g., that of an acid named in the paragraph following Example 3. The corresponding 11-keto compounds are similarly converted to their coresponding 21-acylate esters.

We claim:

1. A compound having the formula

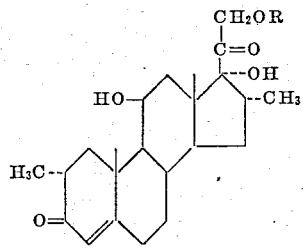

where R is selected from the group consisting of hydrogen and lower alkanoyl.

2. 2α,16α-dimethyl - 11β,17α,21-trihydroxy-4-pregnene-3,29-dione.

3. 2α,16α - dimethyl-11β,17α,21-trihydroxy-4-pregnene-3,20-dione 21-acylate wherein the acyl radical is that of a hydrocarbon carboxylic acid of from one to twelve carbon atoms, inclusive.

4. 2α,16α - dimethyl-11β,17α,21-trihydroxy-4-pregnene-3,20-dione 21-acetate.

(References on following page)

References Cited by the Examiner

UNITED STATES PATENTS 2,852,538  9/1958  Scheri et al. _____ 260—397.45

OTHER REFERENCES

Arth et al.: J. Am. Chem. Soc., vol. 80 (June 20, 1958), pages 3160 and 3161.

Arth et al.: J. Am. Chem. Soc., vol. 80 (June 20, 1958), pages 3161–3163.

Hogg et al.: J. Am. Chem. Soc., vol. 77 (December 5, 1955), pages 6401 and 6402.

Marker et al.: J. Am. Chem. Soc., vol. 64 (1942), pages 1280 and 1281.

Oliveto et al.: J. Am. Chem Soc., vol. 80 (August 20, 1958), page 4428.

Oliveto et al.: J. Am. Chem. Soc., vol. 80 (August 20, 1958), page 4431.

Robinson et al.: J. Am. Chem. Soc. vol. 81 (Jan. 20, 1959), pages 408–410 (p. 408 necessary).

Taub et al.: J. Am. Chem. Soc., vol. 80 (Aug. 20, 1958), page 4435.

LEWIS GOTTS, *Primary Examiner.*

B. E. LANHAM, LESLIE H. GASTON, MORRIS LIEBMAN, *Examiners.*